(12) United States Patent
Lou

(10) Patent No.: US 8,064,858 B1
(45) Date of Patent: *Nov. 22, 2011

(54) DIGITAL CARRIER-RECOVERY SCHEME FOR FM STEREO DETECTION

(75) Inventor: Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/916,335

(22) Filed: Oct. 29, 2010

Related U.S. Application Data

(63) Continuation of application No. 12/106,989, filed on Apr. 21, 2008, now Pat. No. 7,826,812, which is a continuation of application No. 10/819,454, filed on Apr. 6, 2004, now Pat. No. 7,366,488.

(60) Provisional application No. 60/531,302, filed on Dec. 18, 2003, provisional application No. 60/529,656, filed on Dec. 15, 2003.

(51) Int. Cl.
*H04B 1/16* (2006.01)
(52) U.S. Cl. .............................. 455/205; 455/337; 381/2
(58) Field of Classification Search .................. 455/205, 455/214, 216, 227, 307, 323, 334, 337; 381/2, 381/3
See application file for complete search history.

(56) References Cited

U.S. PATENT DOCUMENTS

| | | | |
|---|---|---|---|
| 3,294,916 | A | 12/1966 | Hubert |
| 4,821,322 | A | 4/1989 | Bose |
| 5,357,544 | A | 10/1994 | Horner et al. |
| 5,357,574 | A | 10/1994 | Whitecar |
| 5,404,405 | A | 4/1995 | Collier et al. |
| 5,442,709 | A | 8/1995 | Vogt et al. |
| 6,694,026 | B1 | 2/2004 | Green |
| 7,006,806 | B2 | 2/2006 | Wu et al. |
| 7,133,527 | B2 | 11/2006 | Kasperkovitz |
| 7,149,312 | B1 | 12/2006 | Wildhagen |
| 7,181,018 | B1 | 2/2007 | Green |
| 2003/0087618 | A1 | 5/2003 | Li et al. |
| 2004/0101143 | A1 | 5/2004 | Avalos et al. |
| 2006/0078128 | A1 | 4/2006 | Meeusen |

OTHER PUBLICATIONS

Faller et al., "Technical Advances in Digital Audio Radio Broadcasting", Aug. 2002, Proceedings of the IEEE, vol. 90, No. 8.
Recommendation ITU-R BS. 450-3, "Transmission Standards for FM Sound Broadcasting at VHF", (1982-1995-2001), The ITU Radiocommunication Assembly.

*Primary Examiner* — Blane J Jackson

(57) ABSTRACT

Systems and techniques for processing signals include, in at least one aspect, a method including: receiving an input signal having an associated carrier frequency; multiplying the input signal to produce a multiplied signal; filtering the multiplied signal to produce a high frequency component of the multiplied signal; delaying the multiplied signal to produce a delayed signal; and combining the high frequency component of the multiplied signal with the delayed signal to produce a scaling factor for use in detecting at least one of multiple signal bitstreams associated with the input signal.

20 Claims, 4 Drawing Sheets

US 8,064,858 B1

DIGITAL CARRIER-RECOVERY SCHEME FOR FM STEREO DETECTION

CROSS REFERENCE TO RELATED APPLICATIONS

This application is a continuation of and claims the benefit of priority to U.S. application Ser. No. 12/106,989, filed Apr. 21, 2008, to issue as U.S. Pat. No. 7,826,812, on Nov. 2, 2010, which is a continuation of and claims the benefit of the priority of U.S. patent application Ser. No. 10/819,454, filed Apr. 6, 2004, now U.S. Pat. No. 7,366,488, issued on Apr. 29, 2009, which is related to and claims priority to U.S. Provisional Application Ser. No. 60/529,656, filed Dec. 15, 2003, and U.S. Provisional Application Ser. No. 60/531,302, filed Dec. 18, 2003; each of these prior applications is hereby incorporated by reference.

TECHNICAL FIELD

This disclosure relates to digital techniques for FM stereo reception.

BACKGROUND

Public broadcast of radio is an important source of information and entertainment for people all over the world. The transmission of radio programs is based on analog technology, typically using amplitude modulation (AM), frequency modulation (FM), and stereophonic FM (also referred to as FM stereo). In an analog FM system, an analog signal may be encoded into a carrier wave by variation of its instantaneous frequency in accordance with the input analog signal.

FM stereo was introduced to create a more natural listening experience. Rather than a single signal including all of the audio information, stereo transmission involves separate left (L) and right (R) signals. The received and processed L and R signals are sent to different speakers, reproducing (at least partially) the spatial location of the source of a sound.

There are two systems for transmission of FM stereo defined by the International Telecommunications Union (ITU): the stereophonic multiplex signal system and the pilot tone system. In the pilot tone system (according to the ITU standard), suppressed-carrier amplitude modulation is used to modulate stereophonic information onto a higher frequency, and that information can be combined with mono-compatible information in the baseband to form a composite signal that is then frequency modulated to the appropriate program channel. To detect the stereo signal, the carrier that modulates the stereophonic information needs to be recovered.

SUMMARY

Systems and techniques described herein provide for digital processing of FM mono and stereo signals.

In general, in one aspect, a method of FM digital signal processing may include receiving one or more digital signals including a first signal with a first frequency. The method may include multiplying the first signal to obtain a second signal. Multiplying the first signal may comprise squaring the first signal. The method may include filtering the second signal to obtain a high frequency component of the second signal, where the high frequency component may have a second frequency higher than the first frequency. The second frequency may be twice the first frequency. In some implementations, the first frequency may be a 19 kHz frequency for a pilot tone, and the second frequency may be a 38 kHz frequency for a carrier signal.

Filtering the second signal may comprise filtering the signal with a filter of order n. Delaying the second signal may comprise delaying the second signal using a delay element having a transfer function of $Z^{-(n/2)}$.

The method may further include combining information indicative of the high frequency component of the second signal and the delayed signal to obtain a normalization factor. The method may include generating an output signal of the high frequency component of the second signal and the normalization factor. Combining the high frequency component of the second signal and the delayed signal may comprise generating a difference signal.

The method may further comprise using the output signal to obtain a stereophonic signal. The stereophonic signal may be a left and right difference signal. The method may further comprise obtaining separate left and right signals using the left and right difference signal and a left plus right signal.

In general, in another aspect, a computer program is operable to cause one or more machines to perform operations comprising multiplying data indicative of a first signal having a first frequency to obtain multiplied data. The operations may further comprise filtering the multiplied data, where the multiplied data may include data indicative of a second signal having a second frequency greater than the first frequency. The operations may further include generating delayed data by delaying the multiplied data.

In general, in another aspect, a carrier recovery system may comprise a multiplier having an input to receive one or more digital signals including a first signal having a first frequency, the multiplier configured to generate a second signal by multiplying the first signal. The system may further comprise a high pass filter in communication with the multiplier, the high pass filter to pass a high frequency component of the second signal. The system may further comprise a delay in communication with the multiplier, the delay configured to generate a delayed signal by delaying the second signal.

The system may further comprise a summer configured to sum the high frequency component of the second signal and the delayed signal to obtain a normalization factor. The system may further comprise a combiner configured to generate an output signal using the high frequency component of the second signal and the normalization factor.

In general, in another aspect, a carrier recovery system may comprise multiplying means for multiplying one or more digital signals including a first signal having a first frequency, the multiplying means thereby generating a second signal. The system may further comprise high pass filtering means in communication with the multiplying means. The system may further comprise delay means in communication with the multiplying means.

In general, in another aspect, a method of FM digital processing may comprise receiving one or more digital signals including a first signal having a first frequency. The method may include obtaining a second signal by multiplying the first signal. The method may further include filtering the second signal to obtain a high frequency component of the second signal. The method may further include generating a first normalization factor based on the second signal at a first time. The method may further include generating a second different normalization factor based on the second signal at a second time different than the first time.

The first time and the second time may be separated by a pre-selected time difference. The first time and the second time may be separated by a time difference determined based on one or more parameters of a radio system comprising a transmitter and a transceiver. The one or more parameters may include a transmitter channel effect of the radio system. The one or more parameters may include a transceiver hardware characteristic.

In general, in another aspect, a computer program may be operable to cause one or more machines to perform operations comprising multiplying data indicative of a first signal having a first frequency to obtain multiplied data, the multiplied data including data indicative of a second signal having a second frequency greater than the first frequency. The operations may further comprise filtering the multiplied data to obtain the data indicative of the second signal. The operations may further comprise generating a first normalization factor based on the data indicative of the second signal at a first time, and generating a second different normalization factor based on the data indicative of the second signal at a second time different than the first time.

In general, in another aspect, a carrier recovery system may comprise a multiplier, the multiplier having an input to receive one or more digital signals including a first signal having a first frequency, multiplier configured to generate a second signal by multiplying the first signal. The system may further comprise a high pass filter in communication with the multiplier, the high pass filter configured to pass a high frequency component of the second signal. The system may further comprise a delay in communication with the multiplier, the delay configured to generate a delayed signal by delaying the second signal. The system may further comprise a summer configured to sum the high frequency component of the second signal and the delayed signal to obtain a time-dependent normalization factor. The system may further comprise an output configured to generate a first output signal by combining the high frequency component of the second signal and a value of the time-dependent normalization factor at a first time. The output may be further configured to generate a second output signal by combining the high frequency component of the second signal and a different value of the time-dependent normalization factor at a second different time.

In general, in another aspect, a carrier recovery system may comprise multiplying means, the multiplying means having an input means for receiving one or more digital signals including a first signal having a first frequency, the multiplying means for generating a second signal by multiplying the first signal. The system may further comprise high pass filtering means in communication with the multiplier, the high pass filtering means for passing a high frequency component of the second signal.

The system may further comprise delay means in communication with the multiplying means, the delay means for generating a delayed signal by delaying the second signal. The system may further comprise summing means for summing the high frequency component of the second signal and the delayed signal to obtain a time-dependent normalization factor. The system may further comprise output means for generating a first output signal by combining the high frequency component of the second signal and a value of the time-dependent normalization factor at a first time, the output means further for generating a second output signal by combining the high frequency component of the second signal and a different value of the time-dependent normalization factor at a second different time.

In general, in another aspect, a method includes: receiving an input signal having an associated carrier frequency; multiplying the input signal to produce a multiplied signal; filtering the multiplied signal to produce a high frequency component of the multiplied signal; delaying the multiplied signal to produce a delayed signal; and combining the high frequency component of the multiplied signal with the delayed signal to produce a scaling factor for use in detecting at least one of multiple signal bitstreams associated with the input signal. In a related aspect, a baseband processor is configured to perform the operations of the method. And in another related aspect, a carrier recovery module includes: multiplier circuitry configured to receive an input signal, having an associated carrier frequency, and produce a multiplied signal; filter circuitry coupled with the multiplier circuitry and configured to produce a high frequency component of the multiplied signal; delay circuitry coupled with the multiplier circuitry and configured to produce a delayed version of the multiplied signal; and summer circuitry configured to combine the high frequency component of the multiplied signal with the delayed version of the multiplied signal to produce a scaling factor for use in detecting at least one of multiple signal bitstreams associated with the input signal.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
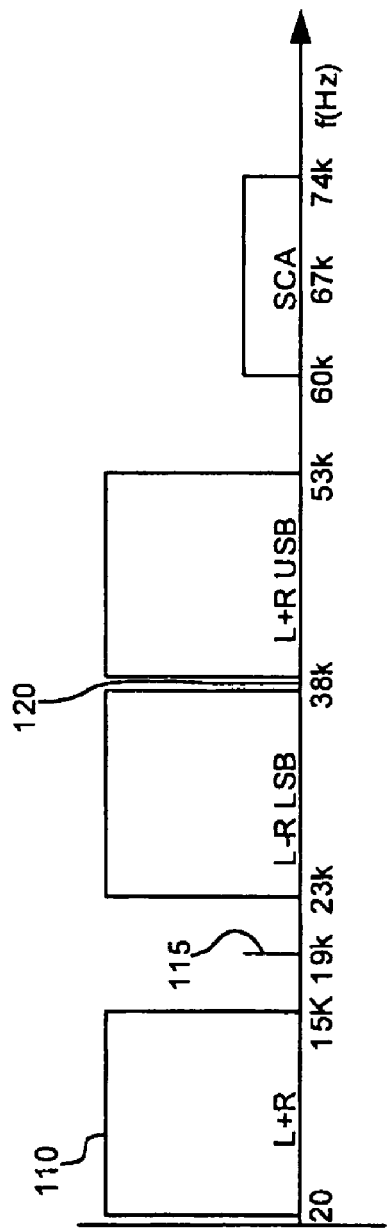
FIG. 1 is a conceptual FM stereo transmission spectrum.

As noted above, a pilot tone FM stereo system uses frequency modulation for a frequency division multiplexed baseband signal having a stereophonic signal and a pilot tone. FIG. 1 shows a conceptual spectrum for FM stereo transmission. According to the ITU specification, a pilot tone system multiplexes the left and right audio signal channels to create a mono-compatible signal that is equal to the sum of the left and right channels (L+R). The mono-compatible signal is transmitted in the baseband 110.

The difference of the left and right channels (referred to as L−R herein; however the R−L may be used) is modulated using suppressed-carrier amplitude modulation with a carrier frequency 120 of 38 kHz. A 19 kHz reference signal, which is referred to as a pilot tone 115, is transmitted as well. Although not discussed herein, there are optional auxiliary data transmission channels such as the Subsidiary Communications Authorization (SCA) channel that are generally transmitted at lower power and higher frequencies (e.g., beyond 53 kHz).

Note also that although the currently used pilot tone and carrier frequencies (19 kHz and 38 kHz, respectively) are discussed herein, the current systems and techniques may be applied for frequencies different than those in current use.

Both the sum and difference signals may be pre-emphasized according to the ITU specification. The L+R, L−R, and the pilot signals form a multiplexed signal that is then frequency modulated to the desired carrier frequency and transmitted. At the receiver, the 38 kHz carrier needs to be recovered using 19 kHz pilot reference signal in order to detect the difference signal.

Figure 2:
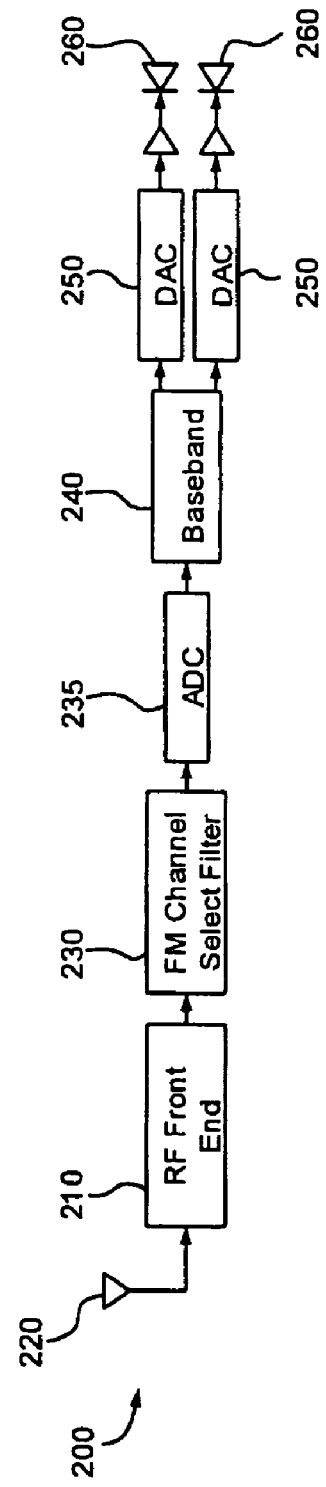
FIG. 2 is a functional block diagram of a digital implementation of an FM stereo receiver.

FIG. 2 shows a functional block diagram of a digital implementation of an FM receiver 200. A radio frequency (RF) analog front-end 210 receives an FM signal from an antenna 220 and transmits an analog signal to an FM channel select filter 230, which filters out the desired program channel. An analog-to-digital converter (ADC) 235 converts the resulting analog signal to a digital signal. Note that the received analog signal may be converted to a digital signal prior to selecting the desired channel, in some implementations.

The digital signal is demodulated using a digital baseband processor 240, described in more detail below. One or more digital to analog converters (DACs) 250 may then be used to transform the left and right channel bitstreams to the analog domain so that they may be played (e.g., the left and right analog signals may be used to drive speakers 260).

Figure 3:
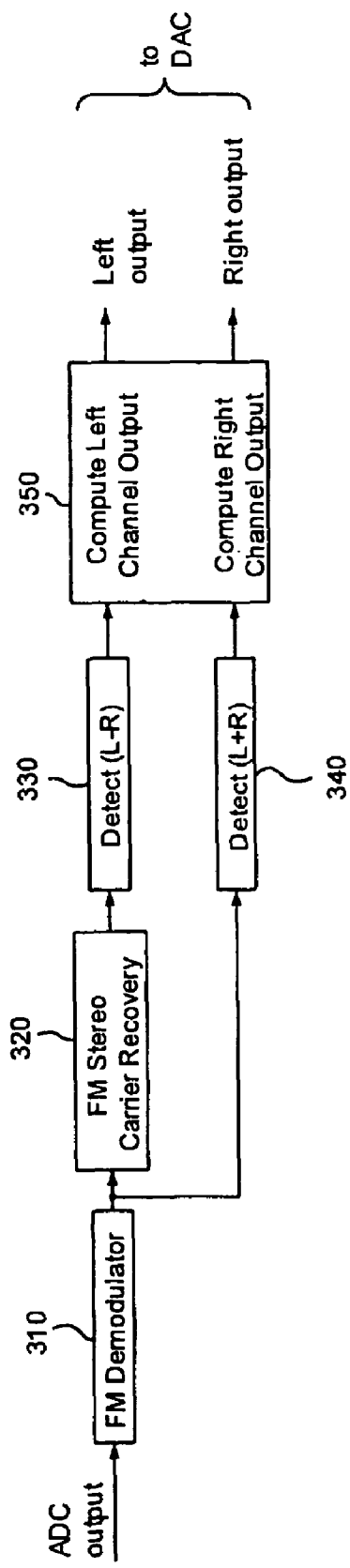
FIG. 3 is a functional block diagram of an implementation of a digital FM stereo baseband processor.

A functional block diagram of an implementation of a digital FM stereo baseband processor such as processor 240 is shown in FIG. 3. An FM demodulator 310 may receive the output bitstream of an ADC such as ADC 235 of FIG. 2. Demodulator 310 extracts the multiplexed L+R, L−R, and the reference pilot tone.

The 38 kHz carrier may be recovered using a carrier recovery module 320. Carrier recovery module 320 uses the pilot tone to recover the 38 kHz carrier in order to detect the L−R bitstream. A detector 330 may implement (for example) bandpass and/or low pass filtering to detect the L−R bitstream.

A detector 340 may implement (for example) low pass filtering to extract the L+R bitstream. Finally, the L+R and L−R bitstreams can be combined appropriately using a combiner 350 to obtain the bitstreams corresponding to the left and right channels. The output of combiner 350 may be provided to one or more DACs, such as DAC 250 of FIG. 2.

Figure 4:
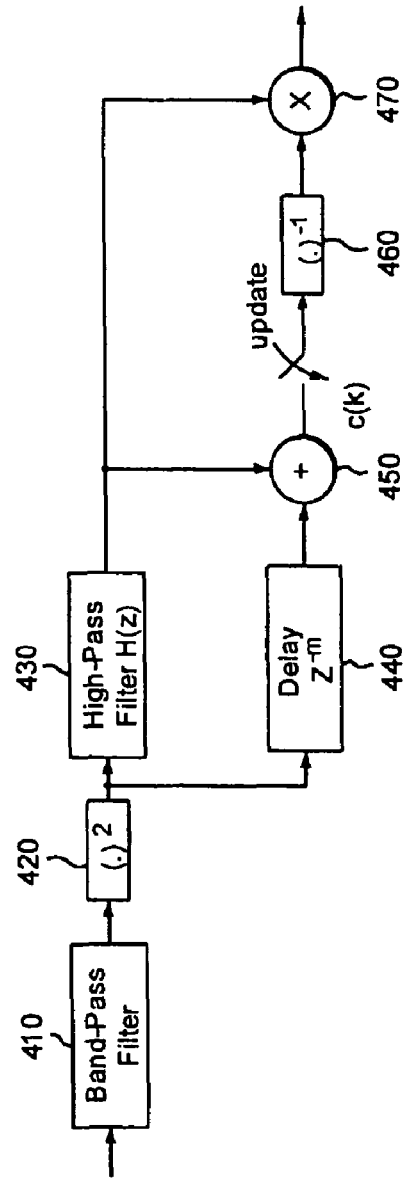
FIG. 4 shows a functional block diagram of an implementation of a carrier recovery module.

FIG. 4 shows an implementation of a carrier recovery module such as carrier recovery module 320 of FIG. 3. A bandpass filter 410 may be used to obtain the 19 kHz pilot tone. A multiplier such as a squaring module 420 may be applied to the filtered signal. The output of squaring module 420 includes both a component at 38 kHz (twice the input signal frequency) and a DC component, as Equation (1) illustrates:

$$\cos^2\alpha = \frac{1}{2}(1+\cos 2\alpha) \quad \text{Equation (1)}$$

A high pass filter 430 may be used to filter out the carrier signal at 38 kHz. Many possible implementations of high pass filters H(Z) may be used to recover the carrier signal.

Squaring (or other multiplication of) the input signal allows for the recovery of a signal at 38 kHz based on the 19 kHz pilot tone. However, magnitude of the L+R and L−R bitstreams may also need to be normalized by determining a scaling factor for the squared input signal. The bitstreams may need to be normalized because, e.g., the transmitter generally scales the magnitude of the pilot tone to a lower power level than the transmitted audio signal.

Furthermore, transmission channel effects (such as a Doppler effect resulting from a moving transmitter and/or receiver) and the transceiver hardware implementation may cause the scaling factor (which may be denoted as a(t)) to change with time. Squaring the pilot tone with a scaling factor can be represented as shown in Equation (2):

$$a^2(t)\cos^2(2\pi f_p t) = \frac{a^2(t)}{2}(1+\cos 2\pi(2f_p)t) \quad \text{Equation (2)}$$

where $f_p$=19 kHz. To estimate the sampled scaling factor $$\frac{a^2(t)}{2},$$

denoted as c(k) in FIG. 4, a low-complexity low-pass filter can be implemented using the combination of the high pass filter 430 (denoted as H(Z) in FIG. 4) and a delay element 440 (denoted as $Z^{-m}$ in FIG. 4, where m=n/2 and n is the order of the filter H(Z)).

The output of filter 430 may be subtracted from the output of delay element 440 using a summer 450. The output of summer 450 is c(k), which may then be inverted using an inverter 460. The output of filter 430 can then be multiplied by 1/c(k) to obtain the recovered and normalized 38 kHz carrier, using a multiplier 470.

As noted above, a(t) (or alternatively c(k)) may vary over time. Accordingly, in some implementations, the scaling factor may be determined a single time, while in others it is updated at least once, updated periodically, or updated generally continuously. For example, if a(t) is changing slowly over time, the computation of c(k) may be done occasionally or periodically. However, if a(t) is changing appreciably, it may be advantageous to update a(t) continuously.

Other implementations of a carrier recovery module may be used. For example, depending on the overall FM stereo receiver architecture design, the correction factor may be passed onto the part of a baseband processor where the magnitude of the L+R and L−R bitstreams are normalized. In an example of such an implementation, the L+R bitstream may be multiplied by c(k) in order to avoid the division operations required to compute 1/c(k).

Figure 5:
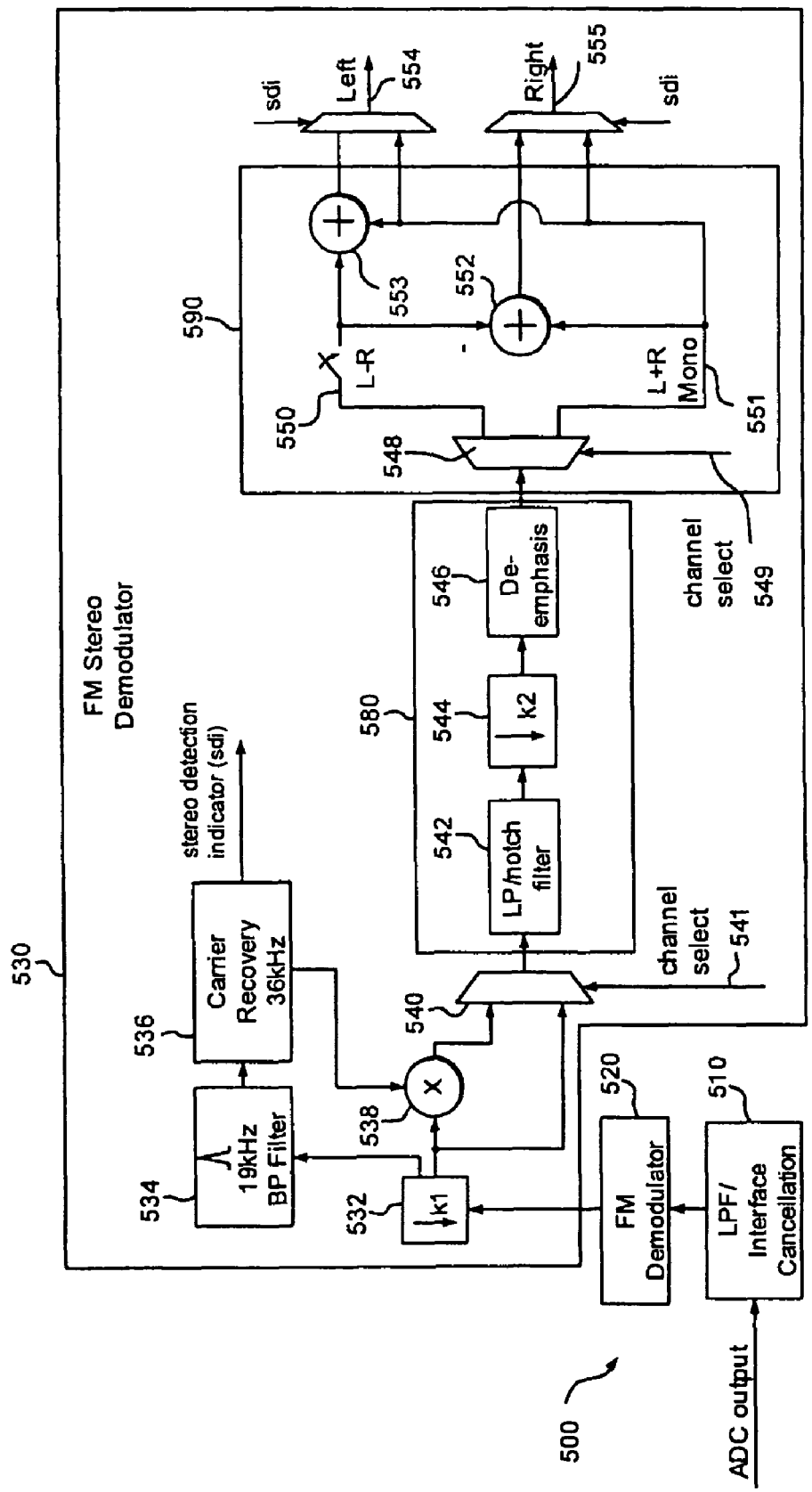
FIG. 5 shows an implementation of an FM stereo receiver system.

Digital FM stereo signal processing may be performed using different receiver architecture implementations. FIG. 5 shows an implementation of an FM stereo receiver system 500. System 500 may receive the output of one or more ADCs such as converter 235 of FIG. 2. A filter 510 may be provided in system 500 for additional channel selection and filtering, to reduce adjacent channel interference.

The output of filter 510 may be provided to a demodulator 520. Demodulator 520 may perform conventional digital FM demodulation. For example, demodulator 520 may obtain the demodulated multiplexed baseband signal by computing the differential of the angle of the complex received signal from the ADC.

The output of demodulator 520 may be provided to an FM stereo demodulator system 530 for recovery of a mono signal (for mono transmission) or left and right signals (for stereo transmission). In some cases, it may be advantageous to down-sample the signal received from the ADC. For example, depending on the particular FM demodulation algorithm and sampling rate used, the signal may be down-sampled by a factor denoted k1 using a down-sampler 532, to reduce the complexity required for subsequent FM stereo demodulation.

In some implementations of system 530, the system may determine if the demodulated signal includes a pilot tone. For example, the demodulated signal may be provided to a bandpass filter 534, and the output of bandpass filter 534 at 19 kHz may be subsequently detected. If the detected magnitude is greater than a threshold magnitude, the system determines that the signal includes a pilot tone and thus detects FM stereo transmission. If the magnitude is less than the threshold magnitude, the system detects mono transmission. A stereo detection indicator (SDI) may be set accordingly, to indicate stereo or mono transmission.

For stereo transmission, a carrier recovery module 536 may recover the 38 kHz carrier so that the L−R bitstream can be down-converted to baseband and subsequently detected. The output from carrier recovery module 536 and from down-sampler 532 (or alternately, FM demodulator 520) may be multiplied using a multiplier 538.

The current inventor realized that a stereo receiver architecture with reduced complexity may be provided by using a common processing module for a mono signal and for both L+R and L−R signals. Alternatively, to increase processing speed, more than one processing module may be provided so that at least some of the signals may be processed in parallel.

For example, system 500 may include a processor 580 for processing mono, L−R, and L−R signals. A multiplexer 540 may receive the input from multiplier 538 and from down-sampler 532. A channel select input 541 determines whether the L−R bitstream or the L+R bitstream (or mono bitstream, for mono transmission) is processed in processor 580.

For detecting both the mono and L+R transmissions, the FM demodulated bitstream is first passed through a filter 542 which may implement both low pass filtering and notch filtering, where a notch at 19 kHz allows the mono or L+R signal to be extracted while rejecting interference from the pilot tone.

The filtered bitstream may be sub-sampled by a factor of k2 using a sub-sampler 544. The bitstream may then be transmitted to a de-emphasis module 546. De-emphasis module 546 may include a filter denoted by G(z), where G(z) can be derived as shown in Equation (3):

$$G(z) = \frac{1-c}{1-cz^{-1}} \qquad \text{Equation (3)}$$

where $c=e^{1/\tau f}$, and where $\tau$ is typically equal to 50 μsec for Europe or 75 μsec for the United States.

The output of de-emphasis module 546 is input to a multiplexer 548. For mono transmission, a channel select input 549 (which may be based on the stereo detection indicator) sends the input signal of multiplexer 548 to both L output 554 and R output 555 via output 551 of multiplexer 548. For stereo transmission, multiplexer 548 sends the input signal to output 551 to be combined with an L−R signal as described below.

For detection of the L−R signal, the output of multiplexer 540 is the input from multiplier 538. The output of multiplexer 540 may be processed by processor 580 in the same manner as described above for processing the L+R or mono signals. The L−R signal is transmitted by multiplexer 548 on output 550 to be combined with an L+R signal.

The L+R and L−R signals are combined as follows. To obtain the R bitstream, the L−R signal is inverted and added to the L+R signal in a summer 552. To obtain the L bitstream, the L−R and L+R signals are added using a summer 553. The L and R bitstreams may then be output via left output 554 and right output 555, converted to analog signals and used to drive separate speakers (not shown).

Figure 6:
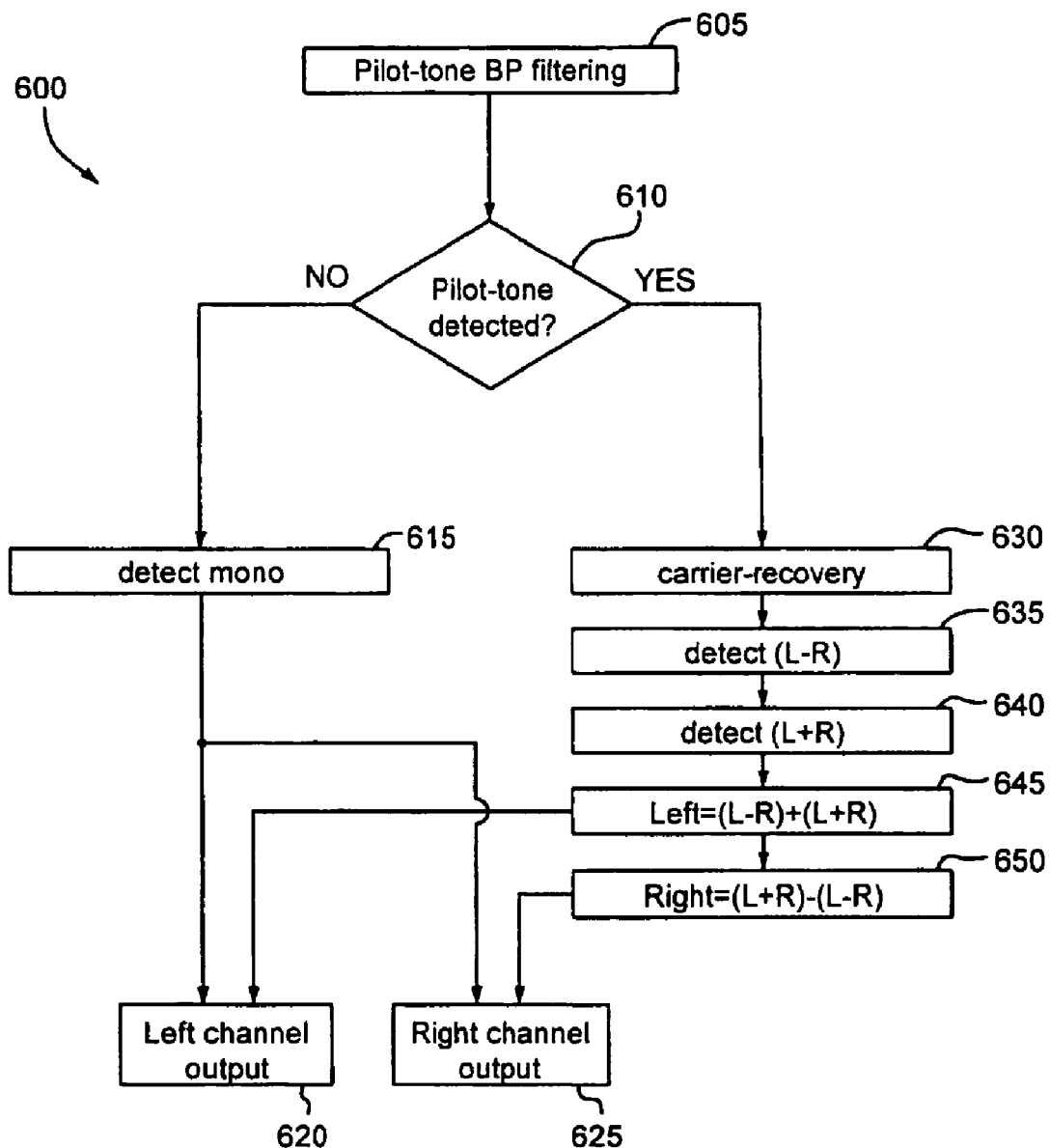
FIG. 6 shows an implementation of a control sequence that may be used with a receiver system such as that shown in FIG. 5.

FIG. 6 is a flow chart illustrating an implementation of a control sequence that may be used with a receiver system such as system 500 of FIG. 5. An input signal may be filtered (605), for example, using a 19 kHz bandpass filter. The output of the filter may be used to detect a pilot tone (610). If a pilot tone is not detected, mono transmission is detected (615). The mono signal is transmitted to both a left channel output (620) and a right channel output (625).

If a pilot tone is detected, carrier recovery may be performed (630). The recovered carrier may be used to detect the L−R bitstream (635). The L+R bitstream may be detected (640). The L+R and L−R bitstreams may be combined to generate a L bitstream (645) that is transmitted to the left channel output (620), as well as to generate a R bitstream (650) that is transmitted to the right channel output (625).

A number of implementations have been described. Nevertheless, it will be understood that various modifications may be made without departing from the spirit and scope of the invention. For example, some functionality described above and illustrated in the figures may be implemented using hardware, using software, or using a combination of hardware and software. Additionally, actions described in a certain order may in some cases be performed in a different order. For example, analog to digital conversion and/or digital to analog conversion may be performed at a different place in the signal processing than described. Accordingly, other implementations are within the scope of the following claims.

What is claimed is:

1. A method comprising:
   receiving an input signal having an associated carrier frequency;
   multiplying the input signal to produce a multiplied signal;
   filtering the multiplied signal to produce a high frequency component of the multiplied signal;
   delaying the multiplied signal to produce a delayed signal; and
   combining the high frequency component of the multiplied signal with the delayed signal to produce a scaling factor for use in detecting at least one of multiple signal bitstreams associated with the input signal.

2. The method of claim 1, comprising outputting the scaling factor to a part of a baseband processor where the signal bitstreams are normalized.

3. The method of claim 1, comprising:
   inverting the scaling factor; and
   multiplying the high frequency component of the multiplied signal with the inverted scaling factor to produce a normalized version of the associated carrier frequency.

4. The method of claim 1, wherein multiplying the input signal comprises squaring the input signal.

5. The method of claim 1, wherein combining the high frequency component of the multiplied signal with the delayed signal comprises subtracting the high frequency component of the multiplied signal from the delayed signal.

6. The method of claim 1, comprising updating the scaling factor periodically.

7. The method of claim 1, comprising updating the scaling factor continuously.

8. The method of claim 1, wherein:
   the filtering comprises filtering using a filter of order n; and
   the delaying comprises delaying the multiplied signal using a delay element having a transfer function $Z-(n/2)$.

9. The method of claim 1, wherein the multiple signal bitstreams comprise a left and right difference bitstream and a left plus right bitstream of a stereophonic signal, the method comprising obtaining left and right channels of the stereophonic signal using the carrier frequency, the carrier frequency recovered using the scaling factor.

10. A baseband processor configured to perform operations comprising:
- receiving an input signal having an associated carrier frequency;
- multiplying the input signal to produce a multiplied signal;
- filtering the multiplied signal to produce a high frequency component of the multiplied signal;
- delaying the multiplied signal to produce a delayed signal; and
- combining the high frequency component of the multiplied signal with the delayed signal to produce a scaling factor for use in detecting at least one of multiple signal bitstreams associated with the input signal.

11. The baseband processor of claim 10, the operations comprising normalizing the signal bitstreams.

12. The baseband processor of claim 10, the operations comprising:
- inverting the scaling factor; and
- multiplying the high frequency component of the multiplied signal with the inverted scaling factor to produce a normalized version of the associated carrier frequency.

13. The baseband processor of claim 10, wherein multiplying the input signal comprises squaring the input signal.

14. The baseband processor of claim 10, wherein combining the high frequency component of the multiplied signal with the delayed signal comprises subtracting the high frequency component of the multiplied signal from the delayed signal.

15. The baseband processor of claim 10, the operations comprising updating the scaling factor periodically.

16. The baseband processor of claim 10, the operations comprising updating the scaling factor continuously.

17. The baseband processor of claim 10, wherein:
- the filtering comprises filtering using a filter of order n; and
- the delaying comprises delaying the multiplied signal using a delay element having a transfer function $Z-(n/2)$.

18. The baseband processor of claim 10, wherein the multiple signal bitstreams comprise a left and right difference bitstream and a left plus right bitstream of a stereophonic signal, the operations comprising obtaining left and right channels of the stereophonic signal using the carrier frequency, the carrier frequency recovered using the scaling factor.

19. A carrier recovery module comprising:
- multiplier circuitry configured to receive an input signal, having an associated carrier frequency, and produce a multiplied signal;
- filter circuitry coupled with the multiplier circuitry and configured to produce a high frequency component of the multiplied signal;
- delay circuitry coupled with the multiplier circuitry and configured to produce a delayed version of the multiplied signal; and
- summer circuitry configured to combine the high frequency component of the multiplied signal with the delayed version of the multiplied signal to produce a scaling factor for use in detecting at least one of multiple signal bitstreams associated with the input signal.

20. The carrier recovery of claim 19, comprising:
- an inverter to couple with an output element of the summer circuitry to produce an inverted version of the scaling factor; and
- a multiplier coupled with the inverter and the filter circuitry to multiply the high frequency component of the multiplied signal with the inverted version of the scaling factor to produce a normalized version of the associated carrier frequency.

* * * * *